July 5, 1966 P. S. SWARTZ 3,258,828

METHOD OF PRODUCING A SUPERCONDUCTIVE SOLENOID DISC

Original Filed May 29, 1963

Inventor:
Paul S. Swartz,
by Paul R. Webb, II
His Attorney.

United States Patent Office 3,258,828 Patented July 5, 1966

3,258,828

METHOD OF PRODUCING A SUPERCONDUCTIVE SOLENOID DISC

Paul S. Swartz, Schenectady, N.Y., assignor to General Electric Company, a corporation of New York Original application May 29, 1963, Ser. No. 284,164. Divided and this application Mar. 22, 1965, Ser. No. 441,488
3 Claims. (Cl. 29—155.5)

This application is a division of my copending patent application Serial No. 284,164, filed May 29, 1963, and assigned to the same assignee as the present invention.

This invention relates to methods for producing superconductive solenoid discs, and more particularly to methods for producing high field superconductive solenoid discs.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in generators, direct current motors and low frequency transformers, and to advances in cryogenics which remove many of the economic and scientific problems involved in obtaining extremely low temperature operations.

As is well known, superconduction is a term describing the type of electrical current conduction, existing in certain materials cooled below a critical temperature, $T_c$, where resistance to the flow of current is essentially non-existent. A high field superconductive solenoid includes a plurality of insulated superconductive windings with a superconducting phase which remains superconducting in a magnetic field greater than 10,000 oersteds.

The present invention is directed to a method of producing an improved high field superconducting solenoid disc employing a winding of superconducting material.

It is an object of my invention to provide a method of producing a high field superconductive solenoid disc.

It is another object of my invention to provide a method of producing a high field superconductive solenoid disc with reproducibility of superconducting properties.

It is a further object of my invention to provide a method of producing a high field superconductive solenoid disc which is compact and with no great mechanical stress.

In carrying out my invention in one form, a method of producing a high field superconductive solenoid disc comprises providing a metallic strip with a core of one metal and a layer of a second metal thereon adapted to form a superconductive alloy, positioning an insulating, non-superconductive strip with a core of non-superconductive metal and a layer of electrical insulation thereon adjacent the first metallic strip, coiling the strips into a spiral, immersing the spiral into a molten metal bath containing one of the metals of the first strip thereby converting the first metallic strip in the bath to a superconductive alloy strip with a layer of metal thereon, coating the spiral with a layer of metal from the bath, and removing bath metal from the opposite faces of the spiral until the edges of the insulating, non-superconductive strip are so exposed as to insulate the successive layers of the superconductive strip from each other.

These and various other objects, features, and advantages of the invention will be better understood from the following description taken in connection with the accompanying drawing in which.

Figures 1, 2, 3, 4, 5, 6, 7, 8, 9:
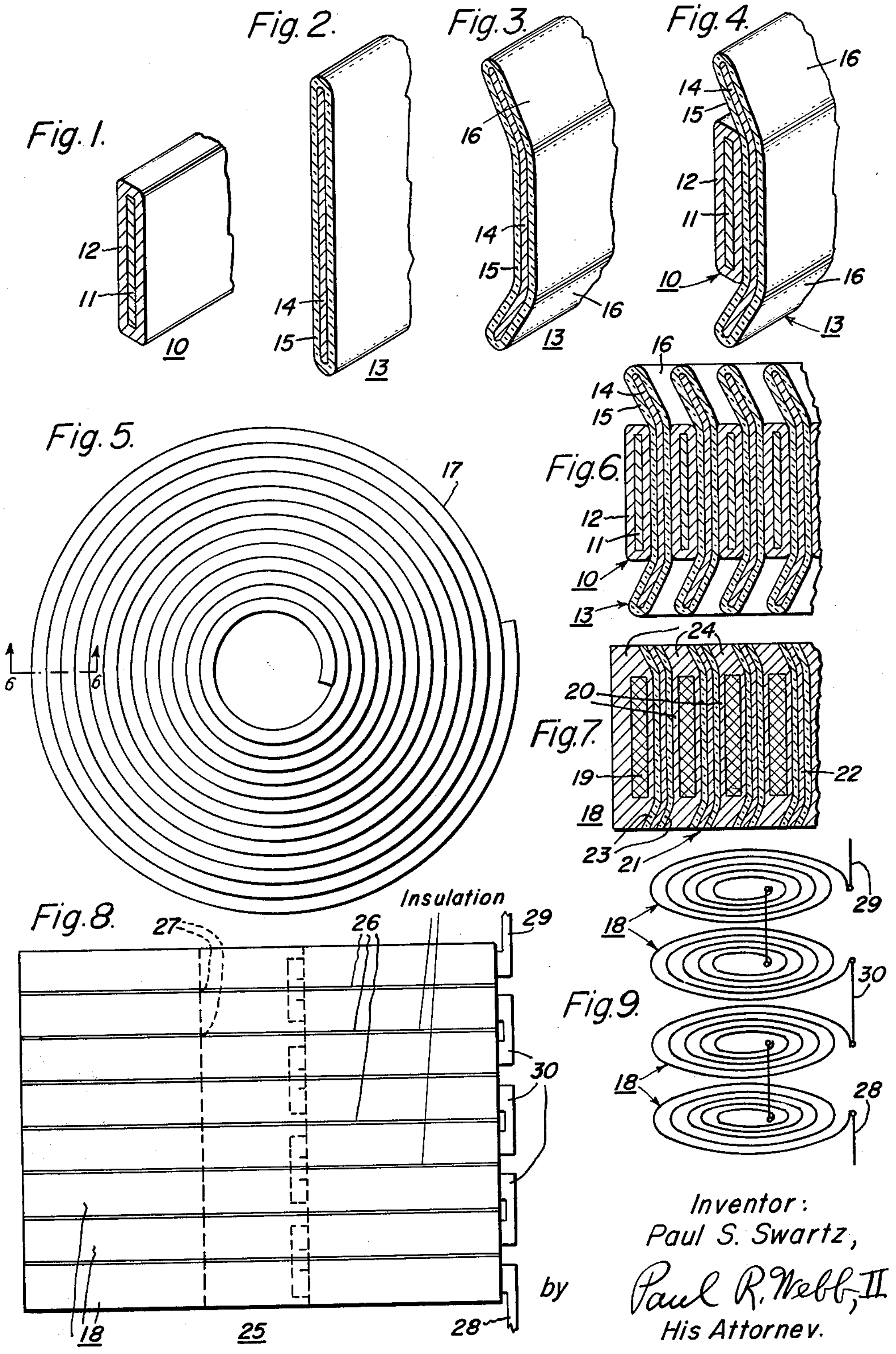
FIGURE 1 is of a perspective view of a portion of a superconductive strip.
FIGURE 2 is a perspective view of a portion of a non-superconducting strip.
FIGURE 3 is a perspective view of a portion of the non-superconductive strip shown in FIGURE 2 after it has been crimped.
FIGURE 4 is a perspective view of a portion of a superconducting strip and a non-superconducting strip positioned adjacent one another.

FIGURE 5 discloses a metallic strip and an adjacent insulating strip wound into a spiral;

FIGURE 6 is a sectional view of a portion of the spiral in FIGURE 5 taken on lines 6—6 thereof;

FIGURE 7 is a sectional view of a portion of the spiral in FIGURE 5 similar to FIGURE 6 after the spiral has been immersed in a molten metal bath, heat treated therein, and machined to a disc;

FIGURE 8 is a side elevational view of a solenoid embodying my invention; and

FIGURE 9 is a schematic view of a portion of the solenoid shown in FIGURE 8.

In FIGURE 1 of the drawing, there is shown in my method of producing a high field superconductive solenoid disc a portion of a length of a metallic strip 10 prior to treatment to form a superconductive alloy which comprises a core 11 of one metal such as niobium with a sheath or layer 12 thereon of a second metal such as tin. While the description of the invention is directed to a solenoid which employs a niobium-tin, $Nb_3Sn$, superconductive strip in its preferred embodiment, other materials may be employed in metallic strip 10 shown in FIGURE 1. For example, strip 10 might comprise a core 11 of vanadium with a gallium layer 12 thereon or a core of niobium 11 with an aluminum layer 12 thereon. While the term strip is employed, strip is intended to include various forms such as ribbon, coil and wire.

In FIGURE 2, an electrically insulated, non-superconductive strip 13 is shown with a core 14 of a metal of high melting temperature such as tungsten and a thin layer 15 of electrically insulating material such as silica glass. The metal which is employed must have a high melting temperature in excess of the treatment temperature of metallic strip 10. For example, the temperature must be in excess of 850° C. for the niobium and tin strip shown in FIGURE 1. Secondly, this metal must be non-superconducting. The thin layer of electrically insulating material must also have a similar high melting temperature, be electrically insulating, and not react excessively at the treatment temperature of metallic strip 10. Various types of materials such as glasses or ceramics might be employed. For example, the glasses might take the form of silica glass or phosphate glass while the ceramics might include alumina and zirconia. It is also desirable that the insulating, non-superconductive strip be of a greater width than the width of the metallic strip.

In FIGURE 3, electrically insulating, non-superconductive strip 13, which was shown in FIGURE 2, is shown with its ends bent or crimped as at 16. In FIGURE 4, there is shown a portion of metallic strip 10 against which is positioned electrically insulating, non-superconductive strip 13. The crimped ends 16 are bent in the direction towards strip 10. The extra width and crimping of strip 13 is to hold strip 10 in position during processing to a disc for employment in a high field superconductive solenoid.

In FIGURE 5 of the drawing, there is shown a spiral 17 which comprises a coiled metallic strip 10 and adjacently positioned electrically insulating, non-superconducting strip 13 as shown in previous FIGURE 4 of the drawing. These strips are shown together as a single strip in spiral form for purposes of illustration.

In FIGURE 6 of the drawing, there is shown a portion of spiral 17 of FIGURE 5 which is taken on line 6—6 of FIGURE 5. Portions of a metallic strip 10 are shown between which are adjacent portions of insulating, non-superconducting strip 13.

Spiral 17, which is shown in FIGURES 5 and 6, includes a metallic strip 10 having a core 11 of niobium and a layer 12 of tin thereon. An electrically insulating non-superconducting strip having a core 14 of tungsten and a layer 15 of silica glass thereon is positioned adjacent strip 10. The spiral is submerged in a bath of molten tin at a temperature of 850° C. or more to convert at least a portion of the niobium in core 11 and tin in layer 12 in strip 10 to a superconductive alloy of niobium-tin, $Nb_3Sn$. During the immersion of spiral 17 in the tin bath, both strips 10 and 13 are covered with tin to form a solid disc 18. The disc is then removed from the bath. A portion of the upper and lower face of the spiral including part of crimped ends 16 of strip 13 and tin therebetween are machined away.

In FIGURE 7 of the drawing, disc 18 is shown which comprises a coiled superconductive alloy strip 19 of niobium-tin, $Nb_3Sn$, a layer of tin 20 covering the surface of strip 19, in insulating non-superconductive strip 21 comprising a core 22 of tungsten and a layer 23 of silica glass electrical insulation, and a coating of tin 24 covering disc 18. It will be noted that portions of tin 24 between portions of strip 13 are insulated from one another.

In FIGURE 8 of the drawing, there is shown a high field superconductive solenoid 25 which comprises a plurality of stacked discs 18 with a layer 26 of mica electrical insulation between each disc 18. A plurality of discs, one of which is shown in FIGURE 7, are stacked in this manner. Each layer of insulation 26 has a central aperture 27 which communicates with the central aperture through each disc 18. A current lead or bar 28 is attached, for example, on the outer periphery of the lowermost disc 18. At the uppermost disc 18 there is attached a current lead or bar 29. Adjacent discs in FIGURE 8 have their strips positioned in opposite directions to provide for electrical contact by connections 30 between adjacent discs 18.

In FIGURE 9, there is shown a schematic diagram of four discs 18 as described above in FIGURE 8 wherein the strips of adjacent discs are positioned in opposite directions. The electrical connections 28, 29 and 30 are also shown in the form of lines connecting these discs.

While other modifications of this invention and variations of method which may be employed within the scope of the invention have not been described, the invention is intended to include such that may be embraced within the following claims.

What I claim as new and desire to secure by Letters Patent of the United States is:

1. A method of producing a high field superconductive solenoid disc which comprises providing a metallic strip with a core of one metal and a layer of a second metal thereon adapted to form a superconductive alloy, positioning an insulating, non-superconductive strip with a core of non-superconductive metal and a layer of electrical insulation thereon adjacent said first metallic strip, coiling said strips into a spiral, immersing said spiral into a molten metal bath containing one of the metals of the first strip thereby converting said first metallic strip in said bath to a superconductive alloy strip, coating said spiral with a layer of metal from said bath, and removing bath metal from the opposite faces of said spiral until the edges of said insulating, non-superconductive strip are so exposed as to insulate the successive layers of said superconductive strip from each other.

2. A method of producing a high field superconductive solenoid disc which comprises providing a metallic strip with a core of niobium and a layer of tin thereon adapted to form a superconductive alloy, positioning an insulating, non-superconductive strip with a core of non-superconductive metal and a layer of electrical insulation thereon adjacent said first metallic strip, coiling said strips into a spiral, immersing said spiral into a molten tin bath thereby converting said first metallic strip in said bath to a niobium-tin alloy strip, coating said spiral with a layer of tin from said bath, and removing bath tin from the opposite faces of said spiral until the edges of said insulating, non-superconductive strip are so exposed as to insulate the successive layers of said superconductive strip from each other.

3. A method of producing a high field superconductive solenoid disc which comprises providing a metallic strip with a core of niobium and a layer of tin thereon adapted to form a superconductive alloy, positioning an electrically insulating, non-superconductive strip with a core of non-superconductive tungsten metal and a layer of silica glass insulation thereon adjacent said first metallic strip, coiling said strips into a spiral, immersing said spiral into a molten tin bath thereby converting said first metallic strip in said bath to a niobium-tin alloy strip, coating said spiral with a layer of tin from said bath, and removing bath tin from the opposite faces of said spiral until the edges of said insulating, non-superconductive strip are so exposed as to insulate the successive layers of said superconductive strip from each other.

No references cited.

WHITMORE A. WILTZ, *Primary Examiner.*

W. I. BROOKS, *Assistant Examiner.*